H. G. NICHOLS.
APPARATUS FOR SEPARATING SOLIDS FROM LIQUIDS.
APPLICATION FILED SEPT. 25, 1909.
996,877.
Patented July 4, 1911.
2 SHEETS—SHEET 1.
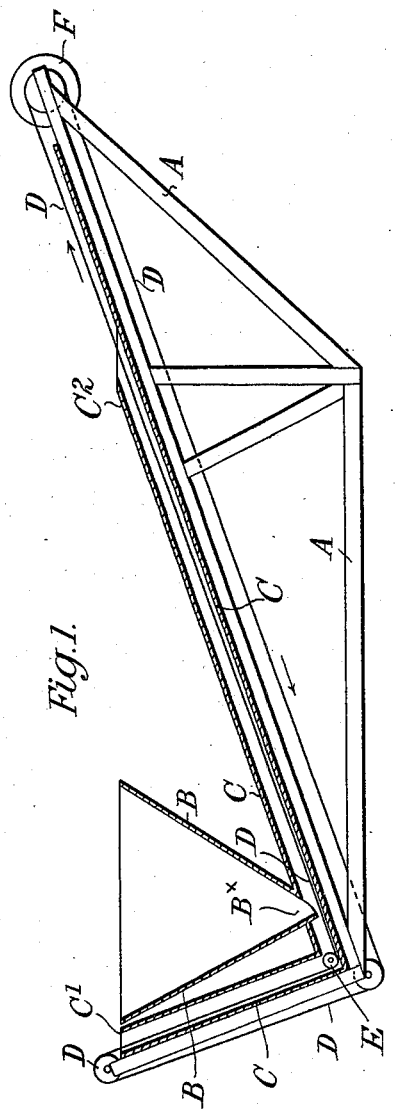
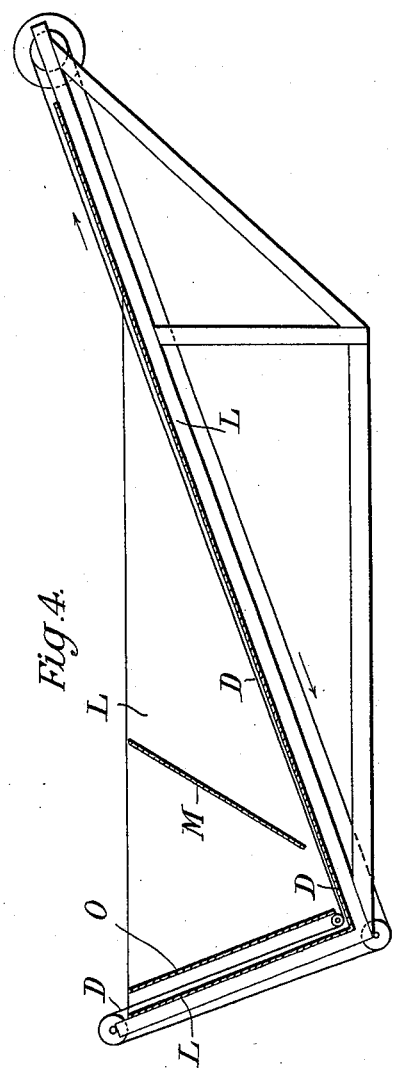
WITNESSES:
J. A. Cook.
S. Drucker
INVENTOR
Horace George Nichols
BY
ATTORNEYS.

H. G. NICHOLS.
APPARATUS FOR SEPARATING SOLIDS FROM LIQUIDS.
APPLICATION FILED SEPT. 25, 1909.
996,877.
Patented July 4, 1911.
2 SHEETS—SHEET 2.
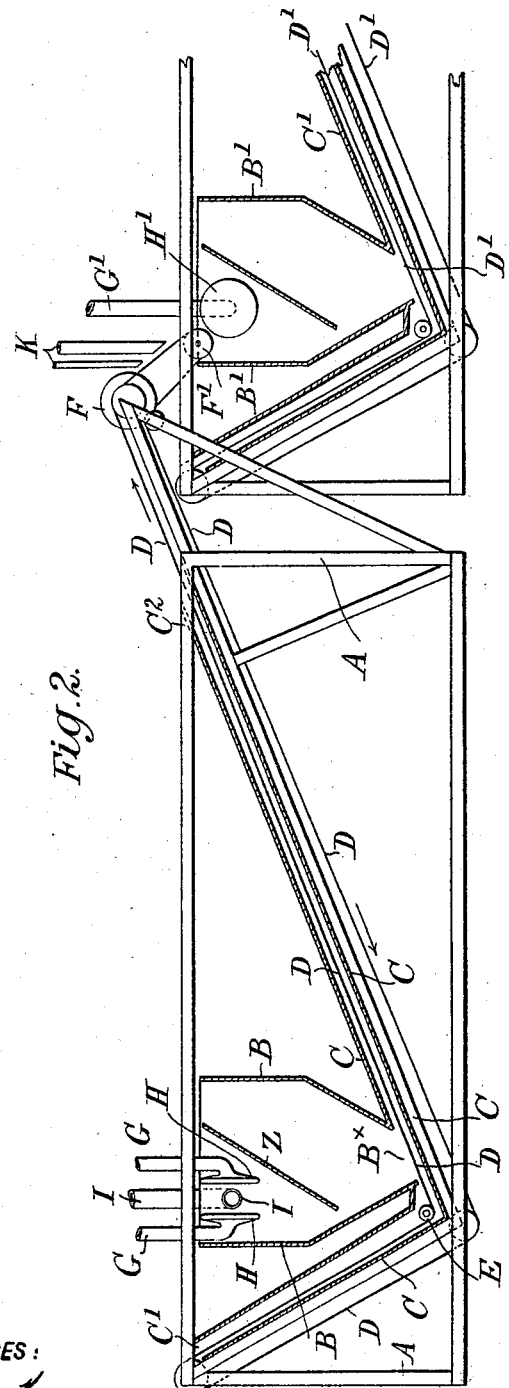
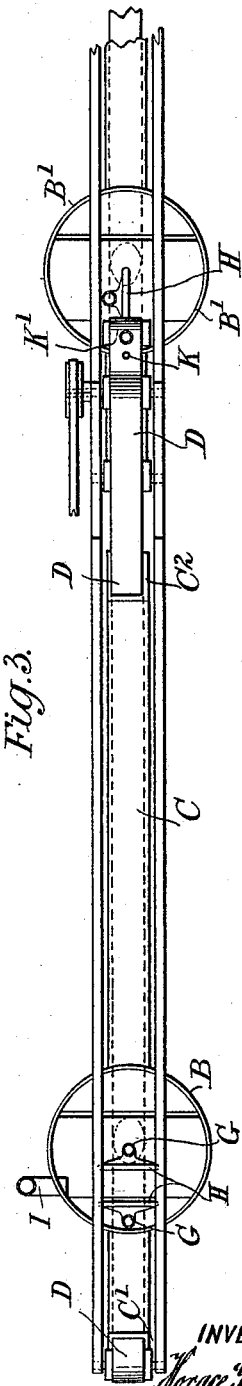

UNITED STATES PATENT OFFICE.

HORACE GEORGE NICHOLS, OF YMIR GOLD MINES LIMITED, NEAR YMIR, BRITISH COLUMBIA, CANADA.

APPARATUS FOR SEPARATING SOLIDS FROM LIQUIDS.

996,877.              Specification of Letters Patent.        Patented July 4, 1911.

Original application filed April 3, 1908, Serial No. 425,068. Divided and this application filed September 25, 1909. Serial No. 519,589.

*To all whom it may concern:*

Be it known that I, HORACE GEORGE NICHOLS, engineer, a subject of the King of Great Britain, residing at Ymir Gold Mines, Ltd., near Ymir, British Columbia, Dominion of Canada, have invented certain new and useful Improvements in Apparatus for Separating Solids from Liquids, of which the following is a specification.

This invention relates to apparatus for the separation of solid contents from a fluid mass (such as ore pulps or wet slimes) containing such solids; and the invention is primarily designed to provide simple, and inexpensive apparatus by which the wet slimes or sand and slimes (from which the valuable contents have been extracted by the well-known cyanid process from gold and silver ores etc.) may be rapidly separated from the (valuable) cyanid solution; or generally this invention may be employed for extracting the solid contents from mill tailings or ore pulp or the like or for any other analogous purposes to which same may be applicable.

Furthermore the present invention has for its object (*inter alia*) to assist or cause or enable the rapid settlement of the solid matter in suspension in a fluid mass (*e. g.* the finely ground material from ore pulp) by steadily and continuously withdrawing said solid matter, as it settles, such settled solid matter being withdrawn—as it settles—from the deepest or a deep part of a settling tank or other vessel (or a compartment therein) into which the fluid mass is introduced; and this is effected, according to the present invention, by causing or permitting the solid matter to settle in such settling tank or vessel (or special settling compartment therein) and, as it settles, withdrawing such settled solid matter continuously and steadily from the lower part of such tank or vessel or compartment by means of a conveyer which is caused to move in close proximity to the bottom of said settling tank or vessel or settling compartment or in close proximity to the point of discharge of said settled matter from the said settling vessel or compartment; and this conveyer brings the deposited solid matter to the exterior of the said settling tank or vessel and there discharges same. This conveyer is an endless traveling conveyer belt; and the said belt, as the solid matter is deposited thereon, passes in an upward direction so as to bring the solid matter on said belt to a point above the top level of the fluid mass, and the solid matter thus withdrawn from the fluid mass, can then be removed from the belt (before the latter returns into the tank or vessel) and thereafter this solid matter can either be subjected to a washing operation (as hereinafter described) or otherwise disposed of in any desired manner.

For the sake of example I will now proceed to fully describe my present invention, more particularly as carried into practice for the separation of the solid components and liquid components of ore pulp or wet slimes; and my said invention comprises the following features:—(1) Means to introduce the wet ore pulp or wet slimes etc. about or over the point where the endless traveling band or other conveyer belt is deeply immersed and advantageously as near as possible over the point of its deepest immersion. (2) A settling chamber or compartment (to which the ore pulp etc. is supplied) interposed between the point of admission of the wet pulp etc. and the said point of deep or deepest immersion of the conveyer belt so that the settling action takes place and is facilitated as hereinafter more fully described. (3) Means to withdraw the settled solid matter from the lower or lowermost part of said settling chamber or compartment quietly and constantly so as on the one hand to avoid disturbance or reduce the amount of disturbance to a minimum and on the other hand to thereby facilitate the settling action in said chamber or compartment. (4) An endless traveling conveyer belt to remove the settled slimes or solid matter deposited on said belt from one settling chamber or compartment into one or more similar settling chambers or compartments where the matter thus removed goes through successive washing and separating processes until the cyanid solution (containing the values) is sufficiently washed out. (5) Means to withdraw the clear solution from the settling chamber or compartment preferably at a point or points as close as possible to the point or points at which the wet ore pulp supply etc. enters said settling tank or compartment—so as to avoid as much as possible (in said settling tank or compartment) the setting up of currents or circulation which would be caused if such points are at extreme ends of the tank or vessel or placed widely apart. (6) A settling chamber or compartment which may either be a separate tank or other vessel advantageously having an upwardly and outwardly sloping bottom and an opening in the lowermost part of such bottom through which opening the settled solid matter is deposited on the conveyer belt as it travels past said bottom opening; and this separate settling tank or vessel may be located within and immersed in the deepest part of a tank with sloping bottom along which latter said conveyer belt travels in an upward direction; or said separate settling tank or vessel may be connected direct with a trunk or conduit or passage-way through which the said conveyer belt travels; or in place of a separate tank or vessel as aforesaid the main tank (which may have an upwardly sloping bottom as aforesaid) may be provided with a partition (or partitions) arranged vertically or otherwise therein so as to provide a settling chamber or compartment (or compartments) in the deepest or deep end or part of the main tank to which the ore pulp supply etc. is introduced.

Referring to the accompanying drawings:—Figure 1 is a diagrammatic side elevation—partly in section—of apparatus according to my present invention. Fig. 2 is a similar view of a modified form of the apparatus showing the arrangement of a plurality of such apparatus for use in succession, and also showing the application of means for introducing the ore pulp or wet slime and withdrawing clear liquid; and Fig. 3 is a plan view of Fig. 2. Fig. 4 is a similar view of Fig. 1 but showing a modified construction.

Referring to Figs. 1 to 3:—In a suitable framework or support A, I mount a settling tank or vessel B which may for example be of circular form in cross-section at the upper part thereof, (see Fig. 3) and either of conical form (as in Fig. 1) or formed with a conical or downwardly converging lower part or bottom having an opening $B^x$ in the lower end thereof in communication with the trunk C in which travels an endless conveyer belt D; this trunk C at the upper end commences at a point $C^1$ above the highest level attained by the liquid in the settling tank, and from this uppermost point $C^1$ the trunk descends to its lowermost point near the bottom opening of said settling chamber (at which lowermost point a roller E is provided for said conveyer belt D to pass around) and from this point the trunk C rises upwardly at a suitable incline (say from 20° to 25° from the horizontal) again to a point $C^2$ above the normal level of the liquid in the settling tank; and the conveyer belt D which passes through this trunk C emerges at the termination $C^2$ of this trunk C and extends to a still higher point, and then passes over one or more rollers F, $F^1$ and then returns exteriorly of the trunk C and tank B to the point where it enters same again and is guided by any suitable rollers and driven by any suitable means.

The wet ore pulp (or slimes etc.) is introduced near the upper part of the settling chamber over the deepest point of immersion of the belt; and I arrange means to withdraw the clear solution from said settling chamber and such withdrawing means are advantageously located as close as possible to the point of admission of the ore pulp supply therein. These withdrawing means may advantageously consist of a suction pipe or pipes G terminating in a suction box or frame or device (such as the nozzles H) of suitable area which is covered or provided with a screen or other suitable filtering means for example textile material such as is at present employed in vacuum filters for slimes; and the arrangement is such as—and means are provided—to prevent the solid matter thickly caking or forming a thick cake on said filter surface of these nozzles H namely this may be prevented by stopping the suction: and applying pressure (air or water) through the nozzles H to thereby blow off the cake or solid matter deposited on said nozzles H.

In the arrangement illustrated in Figs. 2 and 3, I have shown two separate suction pipes G with nozzles H, the filtering surface of each of which latter is arranged in a vertical plane and oppositely disposed to one another and located on opposite sides of and close to the point of admission of the wet ore pulp supply through the pipe I, the outlet from which latter may be advantageously be below the surface of the liquid in the settling chamber or compartment B. Or the suction device or devices may be disposed in any other suitable position; as for example I may employ one large suction device (not shown) with very large filtering surface thereon disposed in a horizontal plane and directed downward in the settling chamber. Thus as the wet ore pulp or slimes solution etc. is supplied to the first settling chamber or compartment B, in Figs. 2 and 3 the clear liquid (cyanid solution containing the values) is drawn off through said suction device or devices G, H, while as the solid matter of said ore pulp or slimes solution etc. settles to the bottom of said settling chamber or compartment B and on to the conveyer belt D traveling below same, said settled solid matter is carried away by said belt D in an upward direction and out of—to a suitable point above the normal level of—the liquid. This said solid matter (which I have found to contain about 22½% of the moisture viz. cyanid solution containing the values) as thus withdrawn is delivered into the settling chamber or compartment B¹ of a second apparatus (shown to the right of Figs. 2 and 3) which may advantageously be similar in all respects to the apparatus already described; this delivery being facilitated by washing this solid matter off the belt D into the chamber B¹ by means of the water supply or jets through the pipes K; in which second apparatus this solid matter is washed by means of any suitable amount of added wash water (say eight or ten times in quantity) and thereby the moisture or liquid (cyanid solution containing the values) carried over in and with the solid matter from the first apparatus is thus diluted. Clear liquid from this weakened cyanid solution in this second apparatus is drawn off (by suction) through the nozzles H¹ and the pipe G¹ as before, while the solid matter is caused or allowed to settle (rapidly) on the belt D¹ as before, and is carried out of the body of liquid and deposited in turn in one or more further apparatus of a similar type and again washed and separated—the operation being repeated as often as desired until sufficiently washed. In practice I have found three such apparatus, acting in sequence, to be sufficient viz. in the first apparatus the first deposition and separation of the solid matter is effected, and in the next two apparatus respectively the said solid matter is washed in succession and then redeposited and then carried out of the apparatus; and after leaving the last depositing apparatus the solid matter is then discharged finally.

I am thus able to use my invention as a continuous process by the aforesaid means.

Z is a baffle plate or partition extending partly across the chamber B (see Fig. 2) which may be used if required to further assist in keeping the liquid mass in the chamber in a still or quiescent condition.

Referring now to Fig. 4 in this arrangement the belt D does not travel in a trunk such as the trunk C in Figs. 1 to 3; but on the contrary, the belt D travels along the sloping bottom of an open tank or vessel L which is filled to the desired level with the wet slimes or ore pulp; and, in this open vessel L, I arrange toward the deep end a sloping partition M which extends the whole width across the tank and extends close down to the belt D at its point of lowest immersion; and also (if desired) I provide the end sloping partition O to guard the belt as it descends to the said lowest part of the tank. I thus form a settling compartment or chamber toward the deepest end of the tank, and the ore pulp is introduced into this settling compartment (between the partitions M and O) and the settling action takes place and is assisted by withdrawing constantly the solid matter as it settles on the belt D as the latter passes below the bottom opening of said settling compartment.

The sequence of apparatus may be arranged all in alinement; and either all on the same level or not, as desired, e. g. the second apparatus may be arranged at a higher level than the first, and the third at a higher level than the second; and so on.

I believe that I am the first to have pointed out and to have applied the discovery in practice, that, by the constant and steady removal of the deposited solid matter from the lowermost part of a settling chamber, vat, tank or compartment, this assists or enables or facilitates the more rapid deposition or settling of the solid matter in suspension above same.

What I claim is:—

1. An apparatus for separating solids from liquids comprising a settling chamber having a discharge opening at the lower part thereof, a conveyer belt arranged to pass under and in close proximity to said discharge opening, means for imparting movement to the belt, and a trunk for the belt to travel through.

2. An apparatus for separating solids from liquids comprising a settling chamber having a discharge opening at the lower part thereof, a conveyer belt arranged to pass under and in close proximity to said discharge opening, means for imparting movement to the belt and a pipe for leading fluid mass to the chamber directly over the opening in the bottom thereof, and suction pipes arranged in proximity to said supply pipe and adapted to communicate suction or pressure.

3. Apparatus for separating solid contents from a fluid mass containing such solids in suspension; comprising the combination of a settling chamber arranged to deposit the solid matter—as it settles in said chamber— upon a conveyer belt at a point of deep immersion of the said belt, a conveyer arranged to pass under and in close proximity to the point of discharge of the settled matter from the lower part of said settling chamber, and means to impart movement to said conveyer belt to discharge the solid matter withdrawn thereon; and a trunk C for the belt to travel through, substantially as and for the purposes described.

4. An apparatus for separating solid contents from a fluid mass containing such solids in suspension; comprising the combination of a settling chamber arranged to deposit the solid matter—as it settles in said chamber—upon a conveyer belt at a point of deepest immersion of the said belt, a conveyer arranged to pass under and in close proximity to the point of discharge of the settled matter from the lower part of said settling chamber, and means to impart movement to said conveyer belt to discharge the solid matter withdrawn thereon; and a trunk for the belt to travel through, substantially as and for the purposes described.

In witness whereof I have hereunto set my hand in presence of two witnesses.

HORACE GEORGE NICHOLS.

Witnesses:
HENRY BIRKBECK,
H. D. JAMESON.

Copies of this patent may be obtained for five cents each, by addressing the "Commissioner of Patents, Washington, D. C."